United States Patent [19]

Price

[11] 4,356,048
[45] Oct. 26, 1982

[54] CAP VISOR AND METHOD OF MANUFACTURE

[75] Inventor: James E. Price, New Albany, Ind.

[73] Assignee: Adver-Togs, Inc., New Albany, Ind.

[21] Appl. No.: 242,154

[22] Filed: Mar. 9, 1981

Related U.S. Application Data

[60] Continuation of Ser. No. 80,206, Oct. 1, 1979, abandoned, which is a division of Ser. No. 823,208, Dec. 5, 1977, Pat. No. 4,249,269.

[51] Int. Cl.³ .................... B29C 27/04; B32B 31/20; B32B 31/22
[52] U.S. Cl. ........................................ 156/220; 2/192; 2/195; 2/200; 156/256; 156/308.4; 156/309.6; 264/241; 156/272.2
[58] Field of Search .............. 156/219, 220, 213, 256, 156/273, 308.4, 309.6; 2/192, 195, 200; 264/319, 241

[56] References Cited

U.S. PATENT DOCUMENTS

| | | | |
|---|---|---|---|
| 2,908,012 | 10/1959 | Feldman | 2/200 |
| 3,072,915 | 1/1963 | Henschel | 2/195 |
| 3,466,214 | 9/1969 | Polk et al. | 156/213 |
| 3,996,088 | 12/1976 | Crouch | 156/220 |

Primary Examiner—Michael G. Wityshyn
Attorney, Agent, or Firm—Warren D. Flackbert

[57] ABSTRACT

A cap visor defined by upper and lower layers of material having an insert board therebetween in a sealed relationship. A flow mold technique patterns one of the layers of material, as, for example, to simulate stitching. In that the insert board is sealed within the layers of material, any damage, as that from water passing through conventional stitching, is prevented.

1 Claim, 2 Drawing Figures

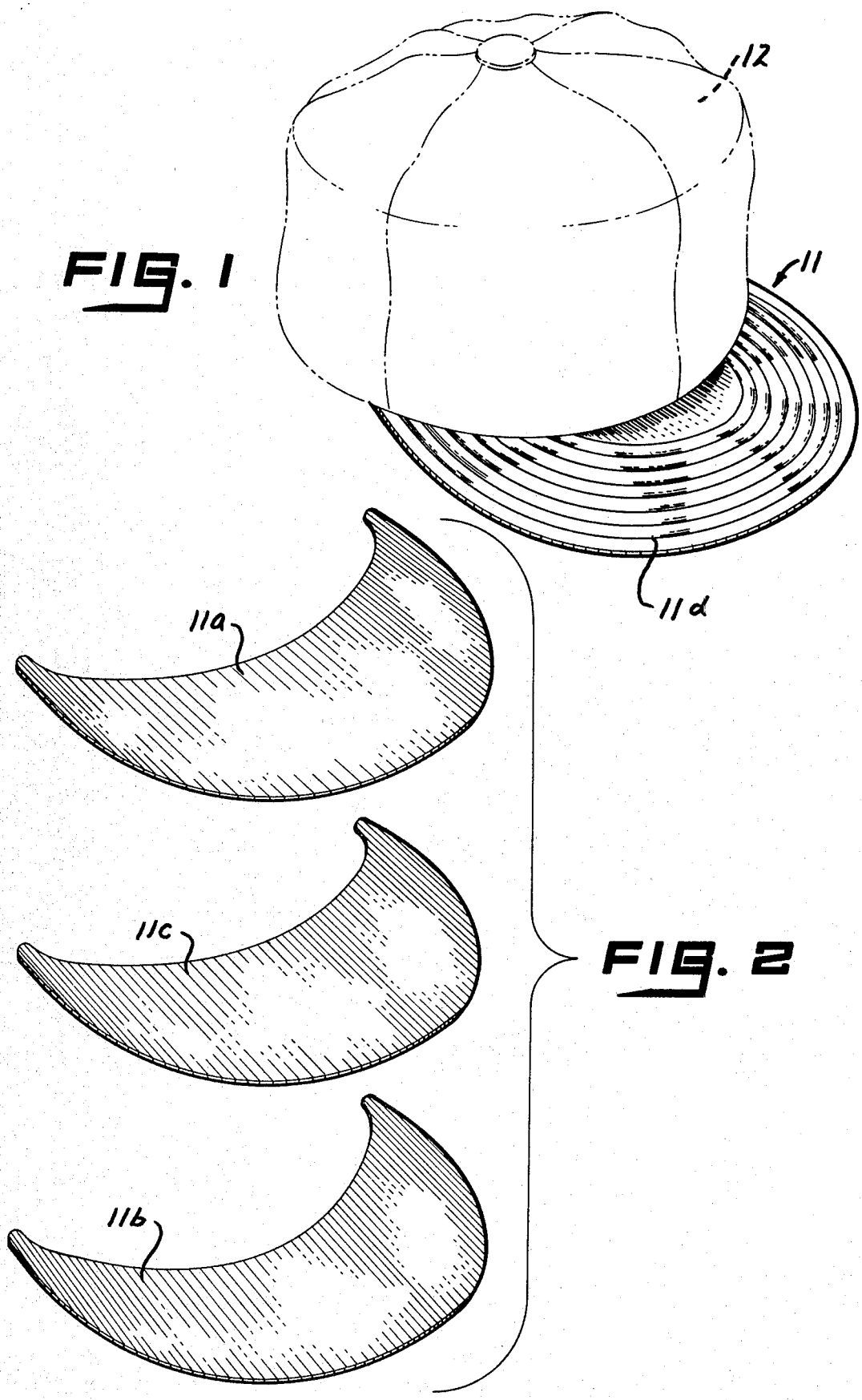

CAP VISOR AND METHOD OF MANUFACTURE

The present application is a continuation of application Ser. No. 080,206, filed Oct. 1, 1979, now abandoned, the latter being a division of application Ser. No. 823,208, filed Dec. 5, 1977, now U.S. Pat. No. 4,249,269.

As is known, the popularity of a sport type cap, i.e. a cap with a visor, is quite widespread, as, for example, with golfers, fishermen, ballplayers or the like. One objection to the presently available sport type cap is that such is susceptible to being totally ruined if water flows on the visor, i.e. through the stitching, for example. Such water damage can result either by rain or the accidental dropping of the cap into a body of water. In any event, as each visor contains an insert board, the water causes the board to buckle, meaning that the cap loses its utility and also becomes rather unsightly on the wearer.

The invention overcomes the preceding objection by affording a visor in which the insert board is sealed within outer vinyl plastic coverings to define an envelope which is impervious to water. In order to provide the usual stitched appearance, the assembled envelope is placed within a mold for simulated stitch lines, and molding is then accomplished through a flow mold operation, the latter functioning by reason of high frequency radio waves.

Following the preceding steps, the remainder of the sports cap is assembled in a conventional manner. The finished product may be in various colors and vary style-wise to suit a particular end purpose. In any event, the cap visor of the invention presents a durable finished item and one which lends itself to a high production rate in that the usual visor stitching is eliminated.

A better understanding of the present invention will become more apparent from the following description, taken in conjunction with the accompanying drawing, wherein FIG. 1 is a perspective view showing a finished cap visor in accordance with the teachings of the present invention, where the cap on which the visor is employed is shown in phantom; and, FIG. 2 is an exploded perspective view of the three components defining the visor, within the encircling bracket, prior to assembly.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the visor 11 of the invention is shown in combination with body 12 (in phantom) of a conventional sport type cap. The visor 11 is defined by an outer layer 11a and an outer layer 11b, both dimensioned generally the same, and cut from vinyl plastic material, and an insert board 11c, made from cardboard or other paper material, for example, but dimensioned smaller than the outer layers 11a and 11b. The preceding relationship is evident in FIG. 2.

In any event, and after manufacture, the visor 11 has the appearance of FIG. 1, i.e. the insert board 11c is sandwiched between the outer layers 11a and 11b. Simulated stitch lines 11d typically appear on the upper surface of the visor 11. As should be understood from the description herebelow, the completed visor 11 is impervious to water, i.e. the insert board 11c is encapsulated in a water sealed relationship so as to prevent warping or the like. The stitch lines 11d add to the appearance of the finished visor 11.

In manufacture, one outer layer 11b is placed onto a job (not shown), where insert board 11c is then positioned on the outer layer 11b. The assembly is completed by placing outer layer 11a over the insert board 11c. In that outer layers 11a and 11b are larger than the insert board 11c, when a heat seal die comes down onto the jig, the outer edges of the outer layers 11a and 11b are sealed together and the insert board 11c is self-contained. As an added step at this time, any excess vinyl plastic material may be stripped from the visor 11.

The completed visor envelope, including the insert board 11c, is then placed onto a hard silicone rubber mold at a flow mold machine. The aforesaid mold includes lines which simulate a conventional stitching pattern on a visor. With the passage of high frequency radio waves through the envelope, the vinyl plastic material is melted, causing the now semi-liquid vinyl material to flow in the mold, and with the aid of air pressure, the contours and patterns defined by the mold are achieved on the visor 11. A cooling period then follows. After the preceding, the visor is ready for conventional assembly into the desired sport type cap.

As stated, the invention provides a visor which is superior to those in use heretofore, i.e. one which not only eliminates machine stitching on the visor, but also, importantly, prevents any buckling of the insert board because of the sealed relationship of the latter within the visor. It should be understood that the stitching pattern on the visor can be modified from that shown, the overall shape varied, or other changes made within the spirit of the invention and, therefore, the preceding description should be considered illustrative and not as limiting the scope of the following claims:

I claim:

1. The method of producing a cap having a watertight visor which comprises the steps of cutting a first vinyl plastic outer cap visor member, an insert board and a second vinyl plastic outer cap visor member into preselected dimensions, assembling said first vinyl plastic outer cap visor member, said insert board and said second vinyl plastic outer cap visor member so that said insert board is sandwiched between all of the edge margins of said first vinyl plastic outer cap visor member and said second vinyl plastic outer cap visor member, heat sealing said edge margins of said first vinyl plastic outer cap visor member and said second vinyl plastic outer cap visor member so that said insert board is encapsulated therewithin around all edges in a fully sealed and watertight relationship, thereafter placing said heat sealed assembled first vinyl plastic outer cap visor member, said insert board and said second vinyl plastic outer cap visor member within a patterned mold, transmitting high frequency radio waves through said patterned mold to cause flow of said first vinyl plastic outer cap visor member into the pattern of said mold and to maintain all of said edges margins in said fully sealed and watertight relationship, and securing said heat sealed assembled first vinyl plastic outer cap visor member, said insert board and said second vinyl plastic outer cap visor member onto the cap.

* * * * *